(12) United States Patent
Burka et al.

(10) Patent No.: US 8,099,723 B2
(45) Date of Patent: *Jan. 17, 2012

(54) REFERENCING A CONSTANT POOL IN A JAVA VIRTUAL MACHINE

(75) Inventors: Peter Wiebe Burka, Ottawa (CA); Graham Alan Chapman, Nepean (CA); Trent A. Gray-Donald, Ottawa (CA); Karl Michael Taylor, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 958 days.

This patent is subject to a terminal disclaimer.

(21) Appl. No.: 12/062,344

(22) Filed: Apr. 3, 2008

(65) Prior Publication Data

US 2008/0189691 A1  Aug. 7, 2008

Related U.S. Application Data

(63) Continuation of application No. 10/886,920, filed on Jul. 8, 2004, now Pat. No. 7,356,811.

(51) Int. Cl.
*G06F 9/45* (2006.01)
*G06F 9/26* (2006.01)

(52) U.S. Cl. .................. 717/148; 711/212; 711/214
(58) Field of Classification Search .................. 717/148; 711/212, 214
See application file for complete search history.

(56) References Cited

U.S. PATENT DOCUMENTS

| | | | |
|---|---|---|---|
| 6,003,038 A | 12/1999 | Chen | |
| 6,338,160 B1 | 1/2002 | Patel et al. | |
| 6,412,108 B1 | 6/2002 | Blandy et al. | |
| 6,446,084 B1 | 9/2002 | Shaylor et al. | |
| 6,745,386 B1 | 6/2004 | Yellin | |
| 6,792,612 B1 | 9/2004 | Baentsch et al. | |
| 2003/0149966 A1 | 8/2003 | McGuire | |
| 2004/0015912 A1 | 1/2004 | Bottomley | |

*Primary Examiner* — Li Zhen
*Assistant Examiner* — Marina Lee
(74) *Attorney, Agent, or Firm* — Winstead, P.C.

(57) ABSTRACT

A method, apparatus, and computer instructions for referencing a constant pool. A determination is made as to whether a bytecode references the constant pool. A relative offset to the constant pool is identified for the bytecode, in response to the bytecode referencing the constant pool. The bytecode is then replaced with a new bytecode containing the relative offset. The relative offset is used to reference the constant pool.

12 Claims, 5 Drawing Sheets

REFERENCING A CONSTANT POOL IN A JAVA VIRTUAL MACHINE

This application is a continuation of application Ser. No. 10/886,920, filed Jul. 8, 2004, status, allowed.

BACKGROUND OF THE INVENTION

1. Technical Field

The present invention relates generally to an improved data processing system and in particular to a method and apparatus for processing data. Still more particularly, the present invention provides a method, apparatus, and computer instructions for referencing a constant pool.

2. Description of Related Art

Java is an object-oriented programming language designed to generate applications that can run on all different types of data processing systems without modification. Developed by Sun Microsystems, Inc. Java has been promoted and geared heavily for the Web, both for public Web sites and intranets. Java programs can be called from within HTML documents or launched standalone. When a Java program called from a Web page runs on a user's machine, this program is called a "Java applet." When a Java program is run on a Web server, it is called a "servlet." A Java program running on a data processing system as a stand-alone non Web-based program is simply referred to as a "Java application."

Java uses an intermediate language called "bytecode." Bytecodes are nonspecific to hardware platforms. The source code of a Java program is compiled into bytecode, which can be moved from one hardware platform to another. In order to run the Java program, it must be compiled into machine code first. The compilation is done either ahead of time like a C/C++ program, a line at a time like an interpreter, or as needed using a just-in-time compiler.

In executing a Java program, such as a Java applet, the Web browser invokes a Java virtual machine (JVM). This component translates bytecodes into machine code for execution. As a result, Java programs are not dependent on any specific hardware and will run in any data processing system with a Java virtual machine.

Many Java bytecodes refer to a constant pool. A constant pool is a collection of data that is stored in the class area in the Java virtual machine. The constant pool is an ordered set of constants used by a class or interface, including literals and symbolic references to types, fields, and methods. The constant pool plays a central role in the dynamic linking of Java programs. The data in the constant pool provides information describing how a bytecode is to be executed. For the Java virtual machine to reference the constant pool, the Java virtual machine must maintain a reference to the start of the constant pool.

Additionally, it is often important for the Java virtual machine to know information about the currently executing Java method. This information may be derived from the program counter, but this process can involve a performance penalty. It is desirable to be able to access both the constant pool and the currently executing method in an efficient manner.

One solution to this problem is for the Java virtual machine to maintain a pointer to the constant pool and a pointer to the current method at all times. This solution generates a new problem because two active pointers are maintained. The pointers reduce the number of processor registers available for other uses and increases the amount of state data saved and restored on Java method invocations.

Another solution involves the Java virtual machine maintaining a pointer to the method at all times and deriving a pointer to the constant pool when access to the constant pool is needed. This solution trades a penalty to access the method pointer for a penalty to access the constant pool. Therefore, it would be advantageous to have an improved method, apparatus, and computer instructions for a Java virtual machine to reference a constant pool.

SUMMARY OF THE INVENTION

The present invention provides a method, apparatus, and computer instructions for referencing a constant pool. A determination is made as to whether a bytecode references the constant pool. A relative offset to the constant pool is identified for the bytecode, in response to the bytecode referencing the constant pool. The bytecode is then replaced with a new bytecode containing the relative offset. The relative offset is used to reference the constant pool.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
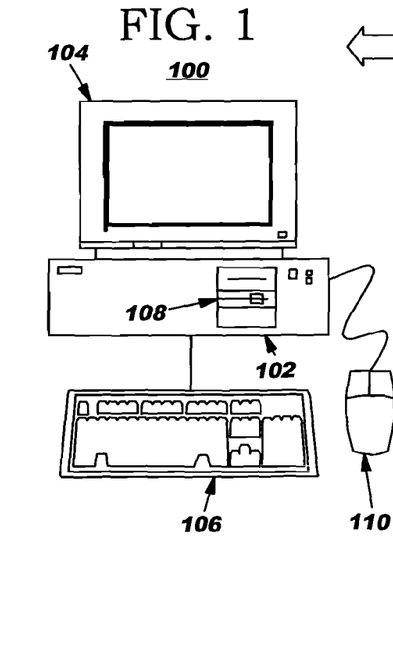
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
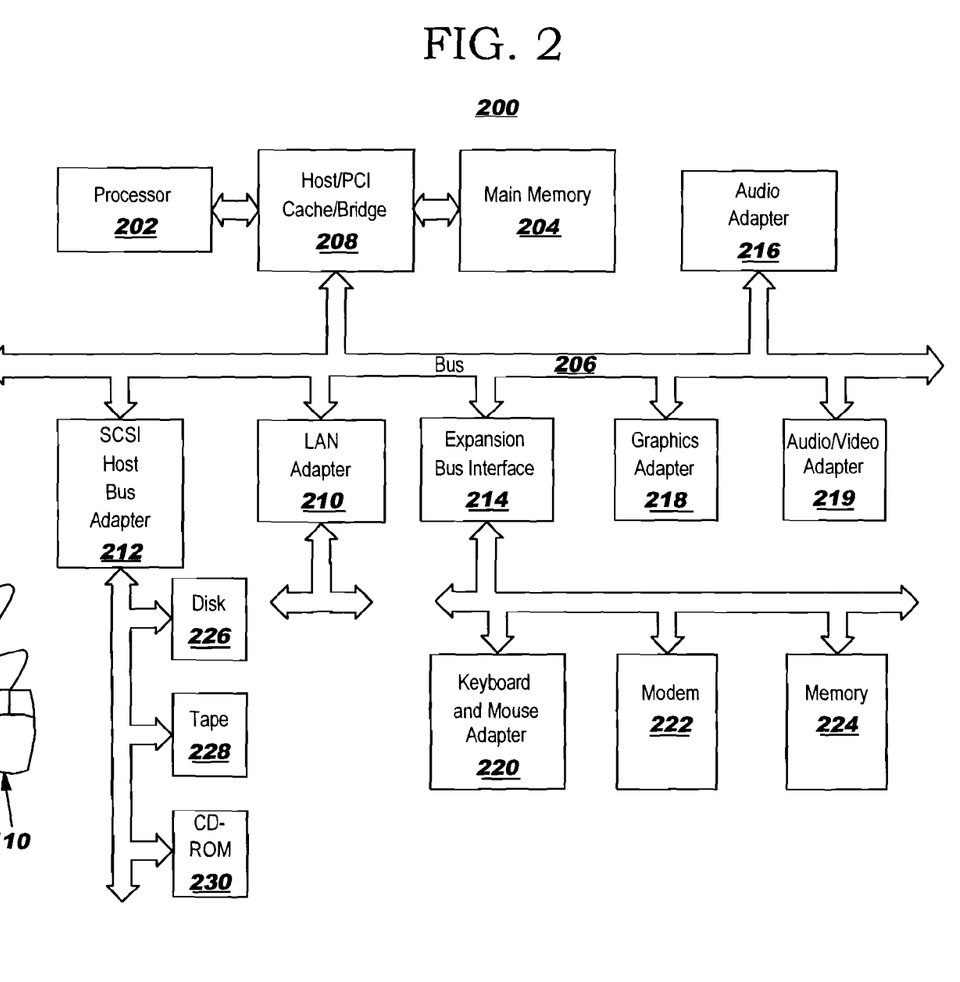
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3:
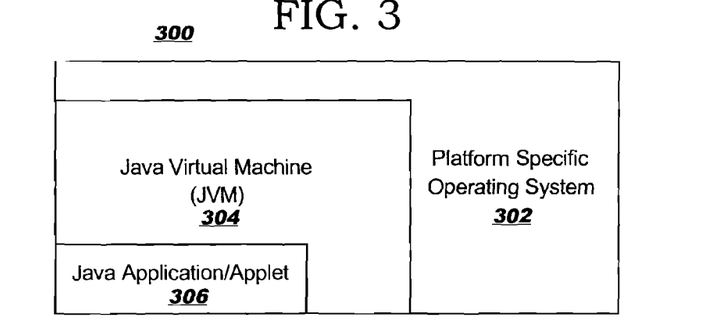
FIG. 3 is a block diagram illustrating the relationship of software components operating within a computer system that may be implemented in the present invention.

With reference now to FIG. 3, a block diagram illustrates the relationship of software components operating within a computer system that may be used to implement the present invention. Java-based system 300 contains platform specific operating system 302 that provides hardware and system support to software executing on a specific hardware platform. JVM 304 is one software application that may execute in conjunction with the operating system. JVM 304 provides a Java run-time environment with the ability to execute Java application or applet 306, which is a program, servlet, or software component written in the Java programming language. The computer system in which JVM 304 operates may be similar to data processing system 200 in FIG. 2 or computer 100 in FIG. 1 described above. However, JVM 304 may be implemented in dedicated hardware on a so-called Java chip, Java-on-silicon, or Java processor with an embedded picoJava core.

At the center of a Java run-time environment is the JVM, which supports all aspects of Java's environment, including its architecture, security features, mobility across networks, and platform independence.

The JVM is a virtual computer, such as a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating system architectures. To enable a Java application to execute on different types of data processing systems, a compiler typically generates an architecture-neutral file format—the compiled code is executable on many processors, given the presence of the Java run-time system.

The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code. Bytecodes may be translated into native code by a just-in-time compiler or JIT.

A JVM loads class files and executes the bytecodes within them. The class files are loaded by a class loader in the JVM. The class loader loads class files from an application and the class files from the Java application programming interfaces (APIs) which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for compiling a method. The native machine code for the method is then cached and reused upon the next invocation of the method. The execution engine also may be implemented in hardware and embedded on a chip so that the Java bytecodes are executed natively. JVMs usually interpret bytecodes, but JVMs may also use other techniques, such as just-in-time compiling, to execute bytecodes.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are typically stored in a dynamically linked library whose exact form is platform specific.

Figure 4:
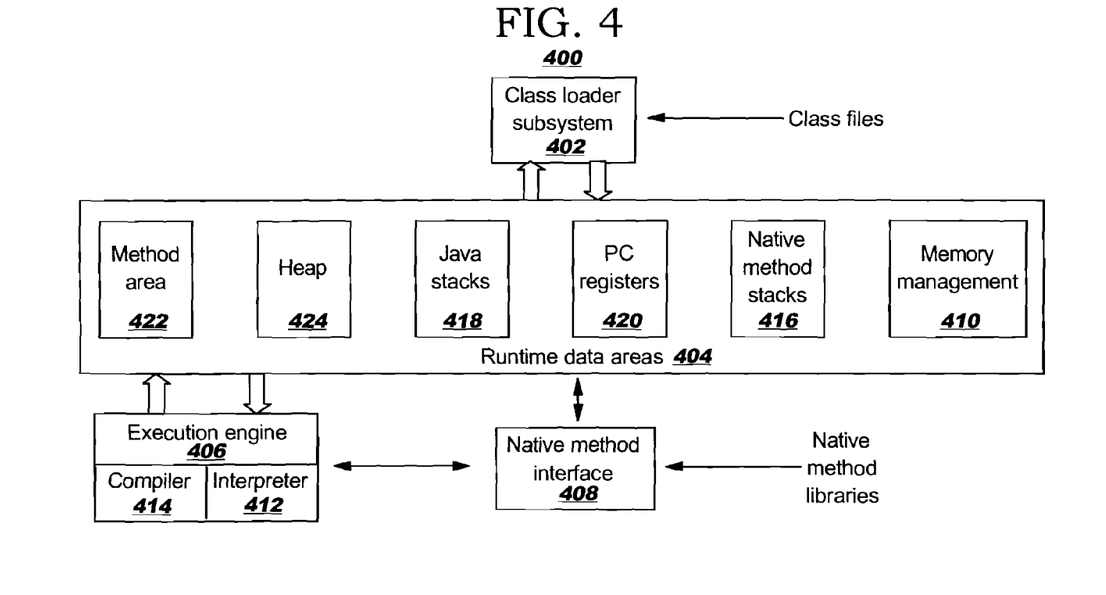
FIG. 4 is a block diagram of a JVM in accordance with a preferred embodiment of the present invention.

With reference now to FIG. 4, a block diagram of a JVM is depicted in accordance with a preferred embodiment of the present invention. JVM 400 includes class loader subsystem 402, which is a mechanism for loading types, such as classes and interfaces, given fully qualified names. JVM 400 also contains runtime data areas 404, execution engine 406, native method interface 408, and memory management 410. Execution engine 406 is a mechanism for executing instructions contained in the methods of classes loaded by class loader subsystem 402. Execution engine 406 may be, for example, Java interpreter 412 or just-in-time compiler 414. Native method interface 408 allows access to resources in the underlying operating system. Native method interface 408 may be, for example, the Java Native Interface (JNI).

Runtime data areas 404 contain native method stacks 416, Java stacks 418, PC registers 420, method area 422, and heap 424. These different data areas represent the organization of memory needed by JVM 400 to execute a program.

Java stacks 418 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it. The JVM does not have any registers for holding intermediate values; any Java instruction that requires or produces an intermediate value uses the stack for holding the intermediate values. In this manner, the Java instruction set is well-defined for a variety of platform architectures.

Program counter (PC) registers 420 are used to indicate the next instruction to be executed. Each instantiated thread gets its own PC register and Java stack. If the thread is executing a JVM method, the value of the PC register indicates the next instruction to execute. If the thread is executing a native method, then the contents of the PC register are undefined. Native method stacks 416 stores the state of invocations of native methods. The state of native method invocations is stored in an implementation-dependent way in native method stacks, registers, or other implementation-dependent memory areas. In some JVM implementations, native method stacks 416 and Java stacks 418 are combined.

Method area 422 contains class data while heap 424 contains all instantiated objects. The constant pool is located in method area 422 in these examples. The JVM specification strictly defines data types and operations. Most JVMs choose to have one method area and one heap, each of which are shared by all threads running inside the JVM, such as JVM 400. When JVM 400 loads a class file, it parses information about a type from the binary data contained in the class file. JVM 400 places this type of information into the method area. Each time a class instance or array is created, the memory for the new object is allocated from heap 424. JVM 400 includes an instruction that allocates memory space within the memory for heap 424 but includes no instruction for freeing that space within the memory. Memory management 410 in the depicted example manages memory space within the memory allocated to heap 424. Memory management 410 may include a garbage collector, which automatically reclaims memory used by objects that are no longer referenced. Additionally, a garbage collector also may move objects to reduce heap fragmentation.

The present invention provides a mechanism to reference items in a constant pool through a method pointer, rather than a constant pool pointer. This mechanism allows for maintaining a pointer to the method at all times and deriving the pointer to the constant pool only when necessary. This mechanism of the present invention does not negatively impact the performance of most Java programs.

Specifically, as Java class files are loaded into the Java virtual machine, the Java virtual machine analyzes the bytecodes in the class files and rewrites them in accordance with a preferred embodiment of the present invention. In the illustrative examples, certain bytecodes which refer to the constant pool are replaced with new bytecodes, which are undefined in the Java virtual machine specification. Although all types of bytecodes which include constant pool may be rewritten using the mechanism of the present invention, only some types of bytecodes might be rewritten using this mechanism. For example, the bytecodes selected for rewriting may be those that are most common or critical for a Java program.

The new versions of the bytecodes are equivalent to the specified versions of the bytecodes, except that the constant pool index in the bytecode is an offset relative to the current method pointer rather than an offset relative to the beginning of the constant pool.

To calculate the offset relative to the method pointer, method pointers are stored in memory in a location relative to the constant pool in which the offset can be calculated while the class files are being loaded by the class loader. In the illustrative embodiment, the method pointers would be placed immediately before the constant pool. Of course in another illustrative embodiment, the method pointers and structures may be placed after the constant pool or with other data between the method pointers and the constant pool.

Calculating the offset from a method pointer to an indexed constant pool entry requires knowing the size of each method pointer and the number of method pointers stored between the current method pointer of interest and the beginning of the constant pool. Of course, many other layout schemes are also possible, depending on the implementation.

In certain, unusual, instances, it may be impossible to replace the original bytecodes with method-relative versions. Changing the relative base may cause the constant pool offset to increase. This may result in an offset which is too large to represent within the 8 or 16-bit constant pool index encoded within each bytecode. In this case, the bytecode is left unchanged and the slower, but still correct, and the constant pool relative bytecode is used.

Figure 5:
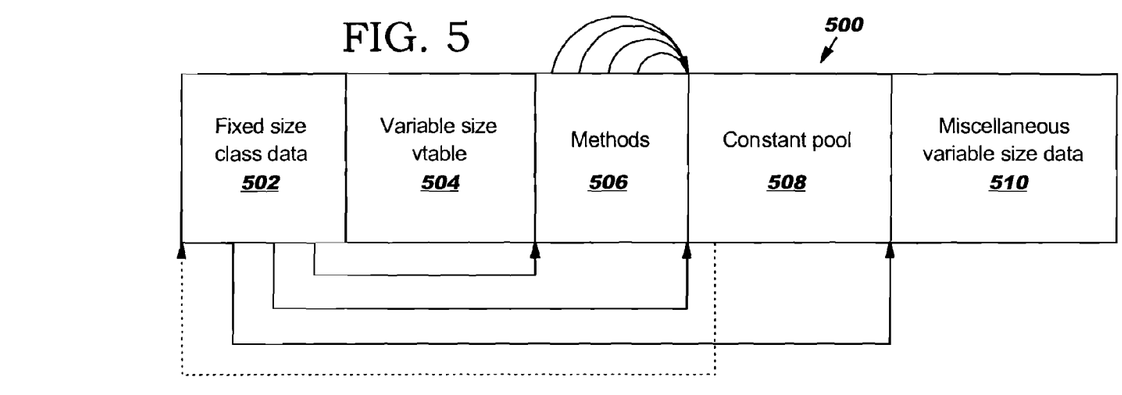
FIG. 5 is a diagram illustrating a class structure overview in accordance with a preferred embodiment of the present invention.

Turning now to FIG. 5, a diagram illustrating a class structure overview is depicted in accordance with a preferred embodiment of the present invention. Class structure 500 includes fixed size class data 502, variable size vtable 504, methods 506, constant pool 508, and miscellaneous variable size data 510. In these examples, this information is located in method area 422 within JVM 400 in FIG. 4. Fixed size class data 502 includes class modifiers, a pointer to the class name, the number of fields in the class, a pointer to a structure describing the fields, the number of methods in the class, a pointer to a structure describing the methods of the class, and other fixed size elements which describe the class. Variable size vtable 504 is a virtual dispatch table—an array of method pointers used to implement virtual dispatching of methods. Methods 506 contain the methods loaded by the class loader. Constant pool 508 is an ordered set of constants used by the type, including literals and symbolic references to types, fields, and methods. Miscellaneous variable size data 510 consists of variable size data structures which help describe the class. Typically these are referred to by pointers in the fixed size class data section 502.

Methods 506 in class structure 500 initially have an offset relative to the beginning of constant pool 508. These bytecodes are replaced with ones that contain an offset relative to the method pointer for the bytecode. As shown, methods 506 are located immediately before constant pool 508. Of course, methods 506 may be located after constant pool 508 or before constant pool 508 with some other data structure being located between these two structures. In this illustrative example, the mechanism of the present invention is implemented in a class loader, such as class loader subsystem 402 in FIG. 4. In other manifestations, the mechanism of the present invention could be implemented in a separate executable which preprocesses class files and translates them into an JVM implementation-specific data format for faster loading (for instance, the SmartLinker tool which forms part of WebSphere Studio Device Developer).

Figure 6:
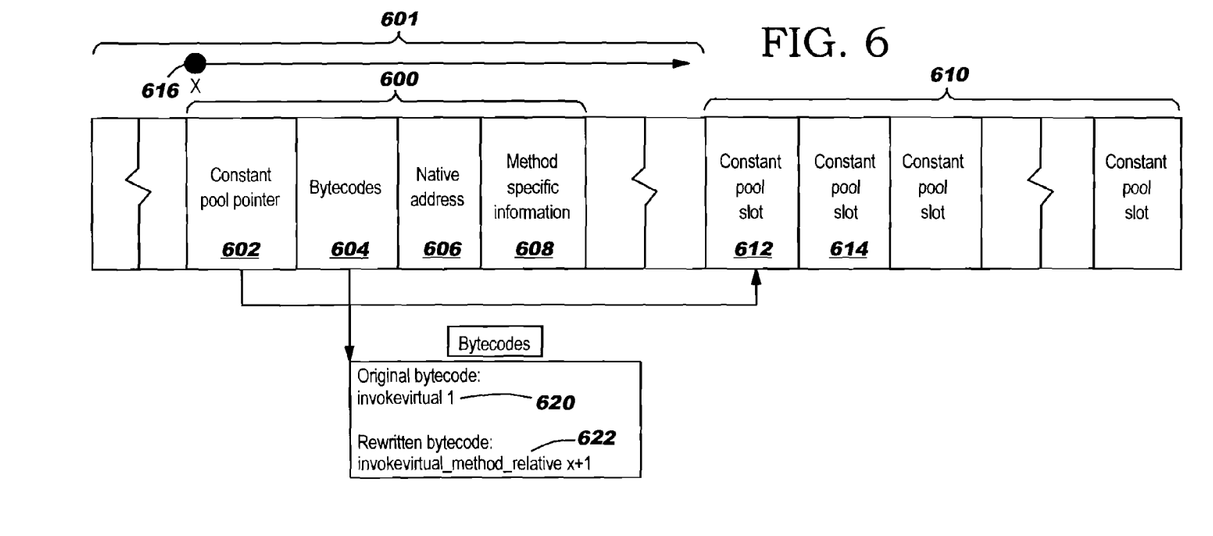
FIG. 6 is a diagram illustrating a method structure and constant pool in which bytecodes are rewritten in accordance with a preferred embodiment.

Turning now to FIG. 6, a diagram illustrating a method structure and constant pool in which bytecodes are rewritten is depicted in accordance with a preferred embodiment. In this figure, method 600 is located within method structure 601. Method 600 includes four slots. These slots contain a pointer. Each pointer is a 32 or 64 bit pointer in the illustrative examples. These slots contain constant pool pointer 602, bytecodes 604, native address 606, and method specific information 608. Constant pool pointer 602 allows access to the class with the current method. Bytecodes 604 includes offsets relative to the beginning of the constant pool. Native address 606 contains a pointer to machine instructions for executing the method. Method specific information 608 contains data used by the native code.

The mechanism of the present invention rewrites bytecodes 604 to contain an offset from the method pointer to an entry within constant pool 610. Constant pool 610 contains slot 612, which is a slot identifying the beginning of constant pool 610. Constant pool pointer 602 points to constant pointer pool slot 612, which is a special slot in constant pool 610 used to indicate the beginning of constant pool 610. In rewriting bytecodes 604, the original bytecode in the slot is invokevirtual 1 620. The offset for this bytecode has a value of 1. When rewritten, the rewritten bytecode is now as follows: invokevirtual_method_relative x+1 622.

The original bytecode contained an offset having a value of 1 relative to the beginning of the constant pool. In this example, the offset of the rewritten bytecode is x+1 and points to constant pool slot 614 from the current method pointer, rather than from the beginning of constant pool 610.

In the original bytecode, in bytecodes 604, this slot is identified by using constant pool pointer 602 to identify the beginning of constant pool 610 and then using the index of 1 to identify constant pool slot 1. When the original bytecode in bytecodes 604 is rewritten, the index of 1 is added to a value of x to provide an offset relative to the method pointer.

Assuming that each method structure contained four slots and that two method structures are present before method 600 relative to constant pool 610, a value of 12 is identified for x. As a result, the offset of x+1 for the rewritten bytecode in bytecodes 604 is 13. This offset is used to provide an offset to identify constant pool slot 614 based on current method pointer 616, which points to the beginning of method 600 in this example.

In this manner, only a single method pointer needs to be maintained. By reducing the number of pointers maintained, resources, such as registers, are conserved. Additionally, the amount of time needed to derive pointers is reduced.

Figure 7:
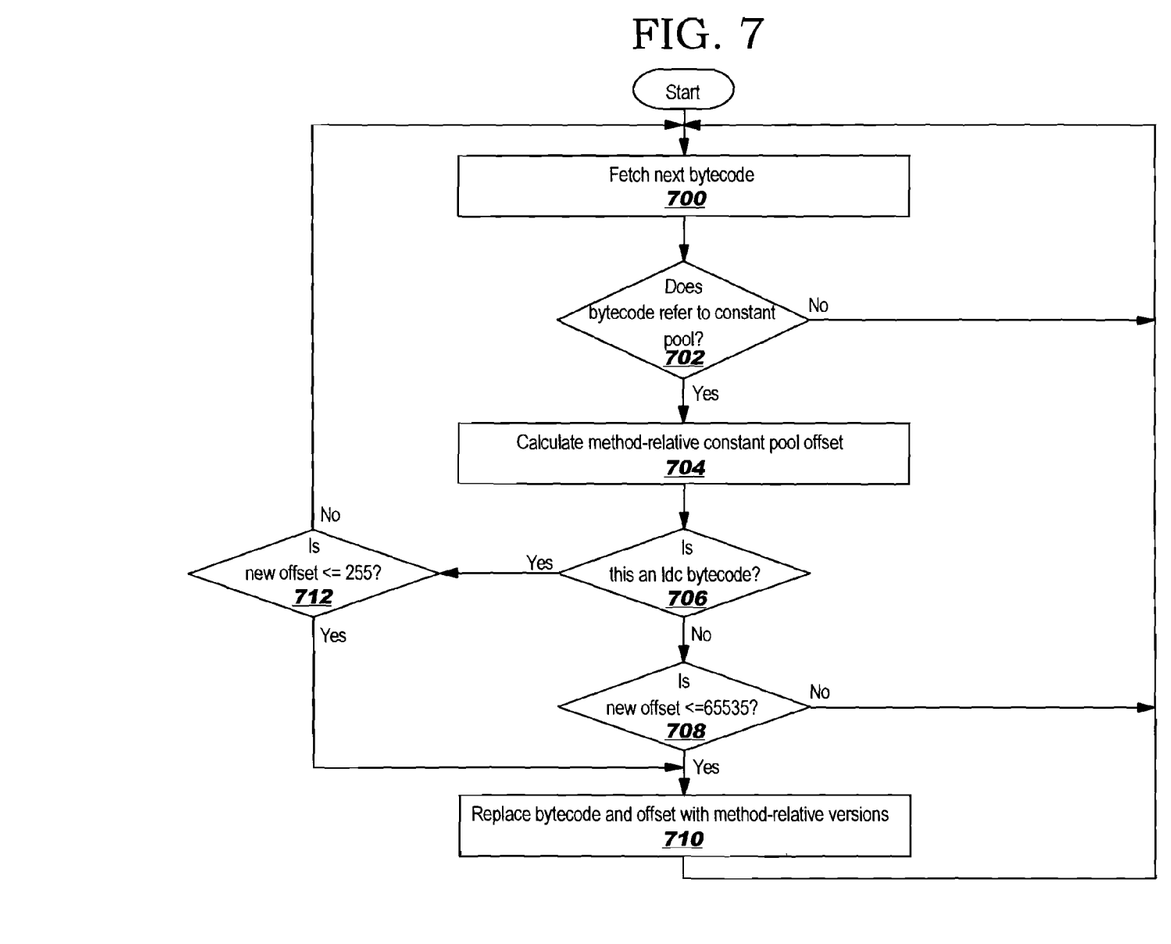
FIG. 7 is a flowchart of a process for rewriting bytecodes in accordance with a preferred embodiment of the present invention.

With reference now to FIG. 7, a flowchart of a process for rewriting bytecodes is depicted in accordance with a preferred embodiment of the present invention. The process illustrated in FIG. 7 may be implemented in a class loader, such as class loader subsystem 402 in FIG. 4.

The process begins by fetching the next bytecode (step 700). Next, a determination is made as to whether the bytecode refers to the constant pool offset (step 702). If the bytecode does refer to the constant pool, then the method-relative constant pool offset is calculated (step 704). The calculation may be made in the illustrative examples by first counting the methods present. The size of each method also is determined. The number of methods after the one referred to by the bytecode is identified. This value is multiplied by the size of the methods. The original index is added to this value to generate the offset for the bytecode to be rewritten.

Next, a determination is made as to whether this is an ldc bytecode (step 706). An ldc bytecode is a special case taken into account in these illustrative examples. This bytecode uses 8 bits, rather than 16 bits. As a result, this type of bytecode has a lower value for offsets. If this bytecode is not a ldc bytecode, then a determination is made as to whether the new offset is less than or equal to 65535 (step 708). If the new offset is not less than or equal to 65535, then the process returns to step 700 as described above. Otherwise, the bytecode is replaced with the new bytecode and the calculated offset that is relative to the method pointer (step 710) with the process then returning to step 700.

Referring back to step 702, if the bytecode does not refer to the constant pool offset, then the process proceeds to step 700 as described above. In step 706, if the bytecode is an ldc bytecode, then a determination is made as to whether the new offset is less than or equal to 255 (step 712). If the new offset is less than or equal to 255, then the process proceeds to step 710 as described above. If the new offset is not less than or equal to 255, then the process proceeds to step 700 as described above.

Figure 8:
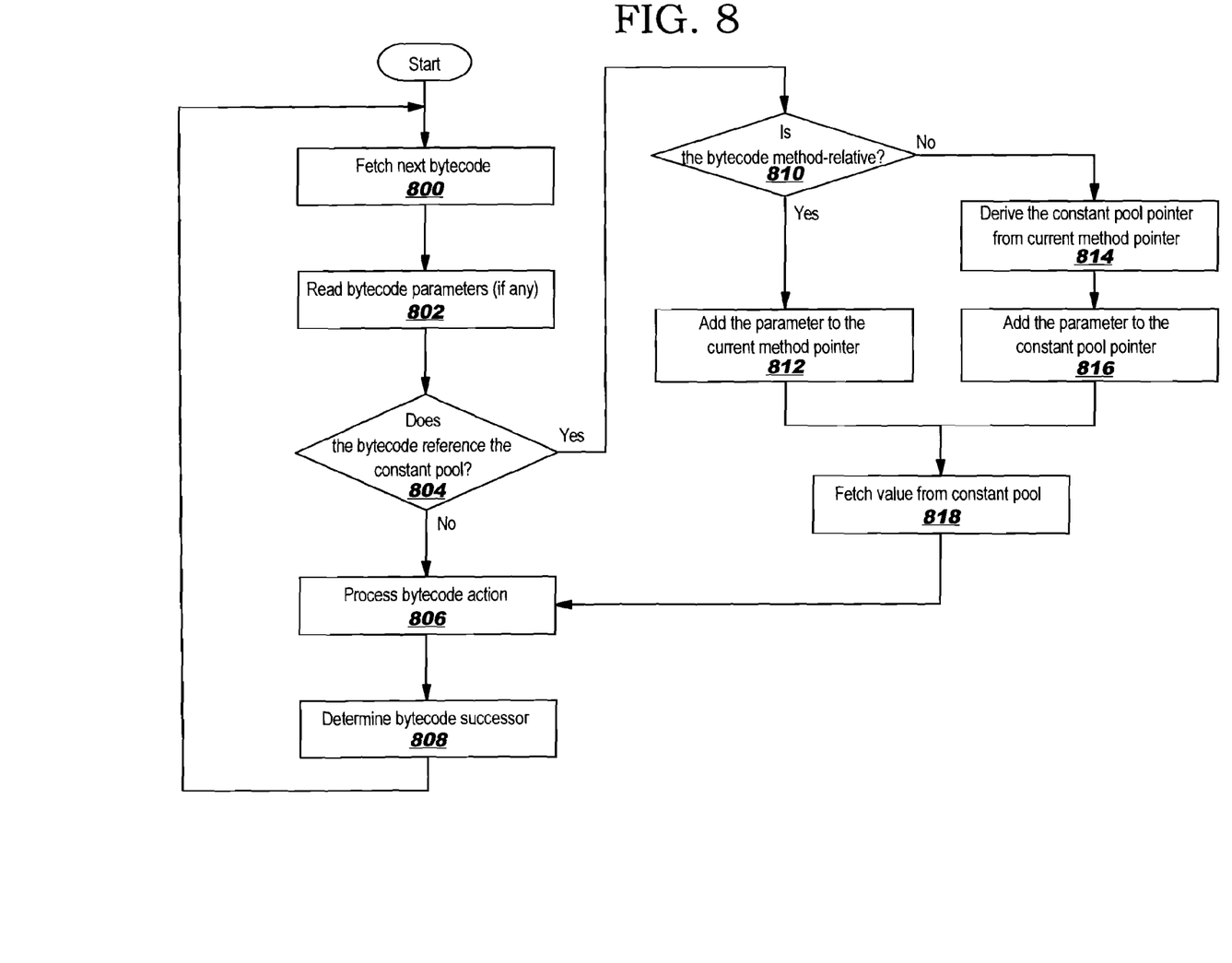
FIG. 8 is a flowchart of a process for processing bytecodes during execution of a Java program in accordance with a preferred embodiment of the present invention.

With reference now to FIG. 8, a flowchart of a process for processing bytecodes during execution of a Java program is depicted in accordance with a preferred embodiment of the present invention. The process illustrated in FIG. 8 may be implemented in an execution engine, such as execution engine 406 in FIG. 4. More specifically, this process may be implemented in interpreter 412 in FIG. 4.

The process begins by fetching the next bytecode for execution (step 800). Next, if any bytecode parameters are present, they are read (step 802). Then, a determination is made as to whether the bytecode references the constant pool (step 804). If the bytecode does reference the constant pool, then a determination is made as to whether the bytecode method is relative (step 810).

If the bytecode is method-relative, then the parameter is added to the current method pointer (step 812). In this case, the parameter is an offset. Then, a value is fetched from the constant pool (step 818). Next, bytecode action is processed using the value from the constant pool (step 806). Then, the bytecode successor is determined (step 808) with the process then proceeding to step 800 as described above.

Referring back to step 804, if the bytecode does not reference the constant pool, then the process proceeds to step 806 as described above. With reference back to step 810, if the bytecode is not method-relative, then the constant pool pointer is derived from the current method pointer (step 814). Then, the parameter is added to the constant pool pointer (step 816) with the process then proceeding to step 818 as described above.

Thus, the present invention provides an improved method, apparatus, and computer instructions for referencing a constant pool. The mechanism of the present invention rewrites bytecodes with new ones that use an offset that is relative to a method pointer, rather than the beginning of the constant pool. In this manner, only one pointer needs to be maintained. Thus, the amount of resources and calculations are reduced through the mechanism of the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for referencing a constant pool, the data processing system comprising:
   a bus;
   a communications unit connected to the bus;
   a storage device connected to the bus, wherein the storage device includes computer usable program code; and
   a processor unit connected to the bus, wherein the processor unit executes the computer usable program code to determine whether a bytecode references the constant pool, responsive to the bytecode referencing the constant pool, to identify a relative offset to the constant pool for the bytecode using a size of each method pointer and a number of method pointers present between a current method pointer for the bytecode and a beginning of the constant pool, wherein the relative offset is a number of slots separating the bytecode and the constant pool, and to replace the bytecode with a new bytecode containing the relative offset, wherein the relative offset is used to reference the constant pool.

2. The data processing system of claim 1, wherein the processor unit further executes the computer usable program code
   responsive to receiving a selected bytecode for execution, to determine whether the selected bytecode references the constant pool,
   responsive to the selected bytecode referencing the constant pool, to add a selected relative offset for the selected bytecode to a current method pointer to form a modified pointer; and
   to fetch a value from the constant pool using the modified pointer.

3. The data processing system of claim 1, wherein the computer usable program code to identify a relative offset to the constant pool for the bytecode and the computer usable program code to replace the bytecode with a new bytecode containing the relative offset are initiated during loading of class files.

4. The data processing system of claim 1, wherein the computer usable program code to determine whether a bytecode references the constant pool, the computer usable program code to identify a relative offset to the constant pool for the bytecode, and the computer usable program code to replace the bytecode with a new bytecode containing the relative offset are implemented in a class loader within a Java virtual machine.

5. The data processing system of claim 1, wherein the processor unit further executes the computer usable program code,
   responsive to the bytecode referencing the constant pool, to determine whether the relative offset is present for a selected bytecode, and
   to derive a constant pool pointer from a current method pointer if the relative offset is absent.

6. The data processing system of claim 1, wherein methods associated with the bytecode are located before the constant pool.

7. A computer program product stored in a recordable-type medium for referencing a constant pool, the computer program product comprising:
   first instructions for determining whether a bytecode references the constant pool;

second instructions, responsive to the bytecode referencing the constant pool, for identifying a relative offset to the constant pool for the bytecode using a size of each method pointer and a number of method pointers present between a current method pointer for the bytecode and a beginning of the constant pool, wherein the relative offset is a number of slots separating the bytecode and the constant pool; and third instructions for replacing the bytecode with a new bytecode containing the relative offset, wherein the relative offset is used to reference the constant pool.

8. The computer program product of claim 7 further comprising:

fourth instructions, responsive to receiving a selected bytecode for execution, for determining whether the selected bytecode references the constant pool;

fifth instructions, responsive to the selected bytecode referencing the constant pool, for adding a selected relative offset for the selected bytecode to a current method pointer to form a modified pointer; and sixth instructions for fetching a value from the constant pool using the modified pointer.

9. The computer program product of claim 7, wherein the second instructions and third instructions are initiated during loading of class files.

10. The computer program product of claim 7, wherein the first instructions, the second instructions, and the third instructions are implemented in a class loader within a Java virtual machine.

11. The computer program product of claim 7 further comprising:

fourth instructions, responsive to the bytecode referencing the constant pool, for determining whether the relative offset is present for a selected bytecode; and fifth instructions for deriving a constant pool pointer from a current method pointer if the relative offset is absent.

12. The computer program product of claim 7, wherein methods associated with the bytecode are located before the constant pool.

* * * * *